(12) United States Patent
Shishihara et al.

(10) Patent No.: US 10,871,193 B2
(45) Date of Patent: Dec. 22, 2020

(54) NEEDLE ROLLER THRUST BEARING

(71) Applicant: JTEKT CORPORATION, Osaka (JP)

(72) Inventors: Yuki Shishihara, Kashiwara (JP); Shigeo Kamamoto, Kashiwara (JP); Junji Murata, Kashiba (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/426,765

(22) Filed: May 30, 2019

(65) Prior Publication Data

US 2019/0368546 A1 Dec. 5, 2019

(30) Foreign Application Priority Data

Jun. 5, 2018 (JP) .................................. 2018-107361

(51) Int. Cl.
*F16C 19/30* (2006.01)
*F16C 33/46* (2006.01)
*F16C 33/66* (2006.01)

(52) U.S. Cl.
CPC .......... *F16C 33/6681* (2013.01); *F16C 19/30* (2013.01); *F16C 19/305* (2013.01); *F16C 33/467* (2013.01); *F16C 33/6685* (2013.01)

(58) Field of Classification Search
CPC ...... F16C 19/30; F16C 19/305; F16C 19/361; F16C 33/4617; F16C 3/4676; F16C 33/494; F16C 33/467; F16C 33/6681; F16C 33/6651
USPC .......................... 384/470, 606, 618, 621, 623
See application file for complete search history.

(56) References Cited

U.S. PATENT DOCUMENTS

| | | | | | |
|---|---|---|---|---|---|
| 2,219,031 | A | * | 10/1940 | Frauenthal | F16C 33/6681 384/572 |
| 3,240,542 | A | * | 3/1966 | Jahn | F16C 19/305 384/623 |
| 4,192,560 | A | * | 3/1980 | Hartnett | F16C 19/30 384/572 |
| 5,630,670 | A | * | 5/1997 | Griffin | F16C 19/30 384/606 |
| 5,816,713 | A | * | 10/1998 | Prock | F16C 19/463 384/580 |

(Continued)

FOREIGN PATENT DOCUMENTS

| | | | | |
|---|---|---|---|---|
| DE | 102009032715 A1 | * | 1/2011 | ............ F16C 33/588 |
| JP | 2009103239 A | * | 5/2009 | ............ F16C 33/588 |

(Continued)

*Primary Examiner* — Marcus Charles
(74) *Attorney, Agent, or Firm* — Oliff PLC

(57) ABSTRACT

A needle roller thrust bearing includes an annular cage and a plurality of rollers. The cage includes a plurality of cage pockets that is radially disposed. The plurality of rollers is housed in the cage pockets and disposed between a first raceway surface and a second raceway surface that axially face each other. Lubricating oil flows from a radially inner side to a radially outer side in an annular space in which the cage and the rollers are provided. The cage includes inner grooves and drainage grooves. Each of the inner grooves connects a circumferentially adjacent pair of the cage pockets by connecting radially inner areas of the pair of cage pockets. Each of the drainage grooves has an opening at an outer circumferential surface of the cage to drain lubricating oil in a circumferential area including radially outer areas of the cage pockets.

6 Claims, 5 Drawing Sheets

(56) References Cited

U.S. PATENT DOCUMENTS

| | | | | |
|---|---|---|---|---|
| 5,938,349 | A | * | 8/1999 | Ogawa .................... F16C 19/30 384/615 |
| 6,102,580 | A | * | 8/2000 | Alling ..................... F16C 19/30 384/470 |
| 7,771,122 | B2 | * | 8/2010 | Nagai ................. F16C 33/4605 384/470 |
| 7,963,703 | B2 | * | 6/2011 | Takamizawa ........... F16C 19/32 384/455 |
| 2018/0003231 | A1 | * | 1/2018 | Weiglein ................... F16C 9/04 |
| 2018/0328406 | A1 | * | 11/2018 | Nakashima ........... F16C 19/305 |
| 2019/0055988 | A1 | * | 2/2019 | Wey ..................... F16C 19/463 |

FOREIGN PATENT DOCUMENTS

| | | | | |
|---|---|---|---|---|
| JP | 2016-200266 | A | 12/2016 | |
| WO | WO-2009068376 | A1 | * 6/2009 | ............ F16C 19/381 |

* cited by examiner

NEEDLE ROLLER THRUST BEARING

INCORPORATION BY REFERENCE

The disclosure of Japanese Patent Application No. 2018-107361 filed on Jun. 5, 2018 including the specification, drawings and abstract, is incorporated herein by reference in its entirety.

BACKGROUND OF THE INVENTION

1. Field of the Invention

The invention relates to a needle roller thrust bearing.

2. Description of Related Art

Needle roller thrust bearings having a high load-carrying capacity and adaptable to high-speed rotation are widely used in various devices, such as transmissions of automobiles and construction equipment. A needle roller thrust bearing includes an annular cage having a plurality of cage pockets that is radially disposed, and a plurality of rollers housed in the cage pockets. The plurality of rollers is disposed between a first raceway surface and a second raceway surface that axially face each other. Each of the rollers rolls on the first raceway surface and the second raceway surface as the needle roller thrust bearing rotates. Such a needle roller thrust bearing is disclosed in Japanese Patent Application Publication No. 2016-200266 (JP 2016-200266 A).

One factor of rolling resistance of such a needle roller thrust bearing is sliding friction resistance between components. An example of the sliding friction resistance is sliding friction resistance caused by sliding between the rollers and the raceway surfaces. More specifically, in the needle roller thrust bearing, the rollers are housed in the cage pockets that are radially disposed. When the needle roller thrust bearing rotates, a running distance of the rollers varies between a radially inner position and a radially outer position. This causes the rotating rollers to slide on the raceway surfaces. This sliding generates a resistance. Other factors causing the sliding friction resistance may include sliding between the rollers and the cage in contact and sliding between the cage and a bearing ring in contact.

Factors of the rolling resistance of the needle roller thrust bearing include stirring resistance of lubricating oil in addition to the sliding friction resistance described above. For example, excessive lubricating oil around the cage and the rollers increases the stirring resistance.

To increase rolling efficiency, or, in other words, to reduce rolling loss of such a device as those described above, it has been desired to lower torque (reduce rolling resistance) of the needle roller thrust bearing in recent years.

SUMMARY OF THE INVENTION

An object of the invention is to reduce both sliding friction resistance and stirring resistance of lubricating oil that are factors of rolling resistance of a needle roller thrust bearing.

According to an aspect of the invention, a needle roller thrust bearing includes an annular cage and a plurality of rollers. The cage has a plurality of cage pockets that is radially disposed. The plurality of rollers is housed in the cage pockets and disposed between a first raceway surface and a second raceway surface that axially face each other. The cage and the rollers are provided in an annular space defined between the first raceway surface and the second raceway surface such that lubricating oil flows in the annular space from a radially inner side to a radially outer side. The cage has inner grooves and drainage grooves. Each of the inner grooves connects a circumferentially adjacent pair of the cage pockets by connecting radially inner areas of the pair of cage pockets. Each of the drainage grooves has an opening at an outer circumferential surface of the cage to drain lubricating oil in a circumferential area including radially outer areas of the cage pockets radially outward.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
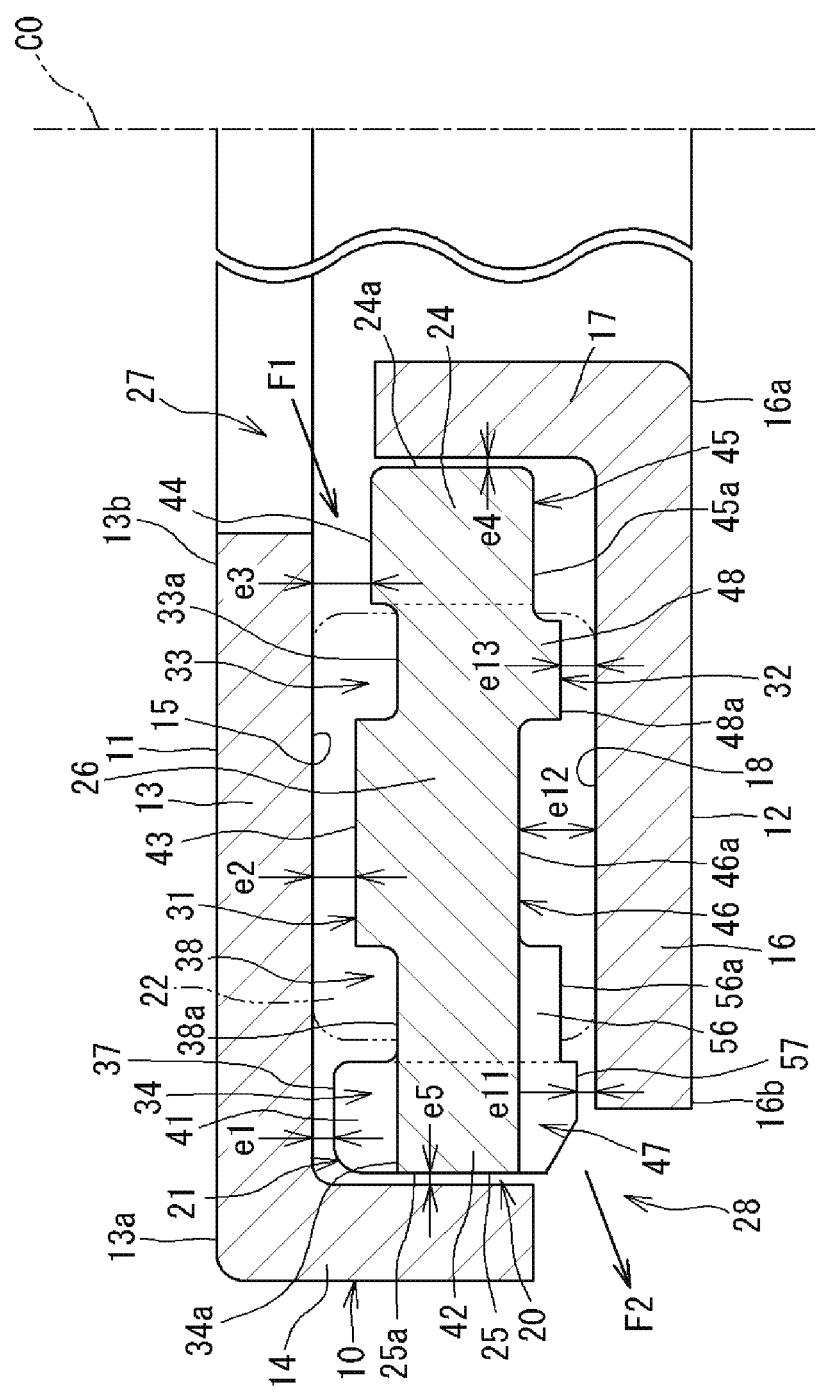
FIG. 1 is a sectional view illustrating a needle roller thrust bearing according to an embodiment of the invention.

FIG. 1 is a sectional view illustrating a needle roller thrust bearing 10 according to an embodiment of the invention. The needle roller thrust bearing 10 (hereinafter sometimes simply referred to as the bearing 10) is used in a transmission of an automobile, for example. Lubricating oil is stored in a housing included in the transmission, and used for lubrication of the bearing 10.

Figure 2:
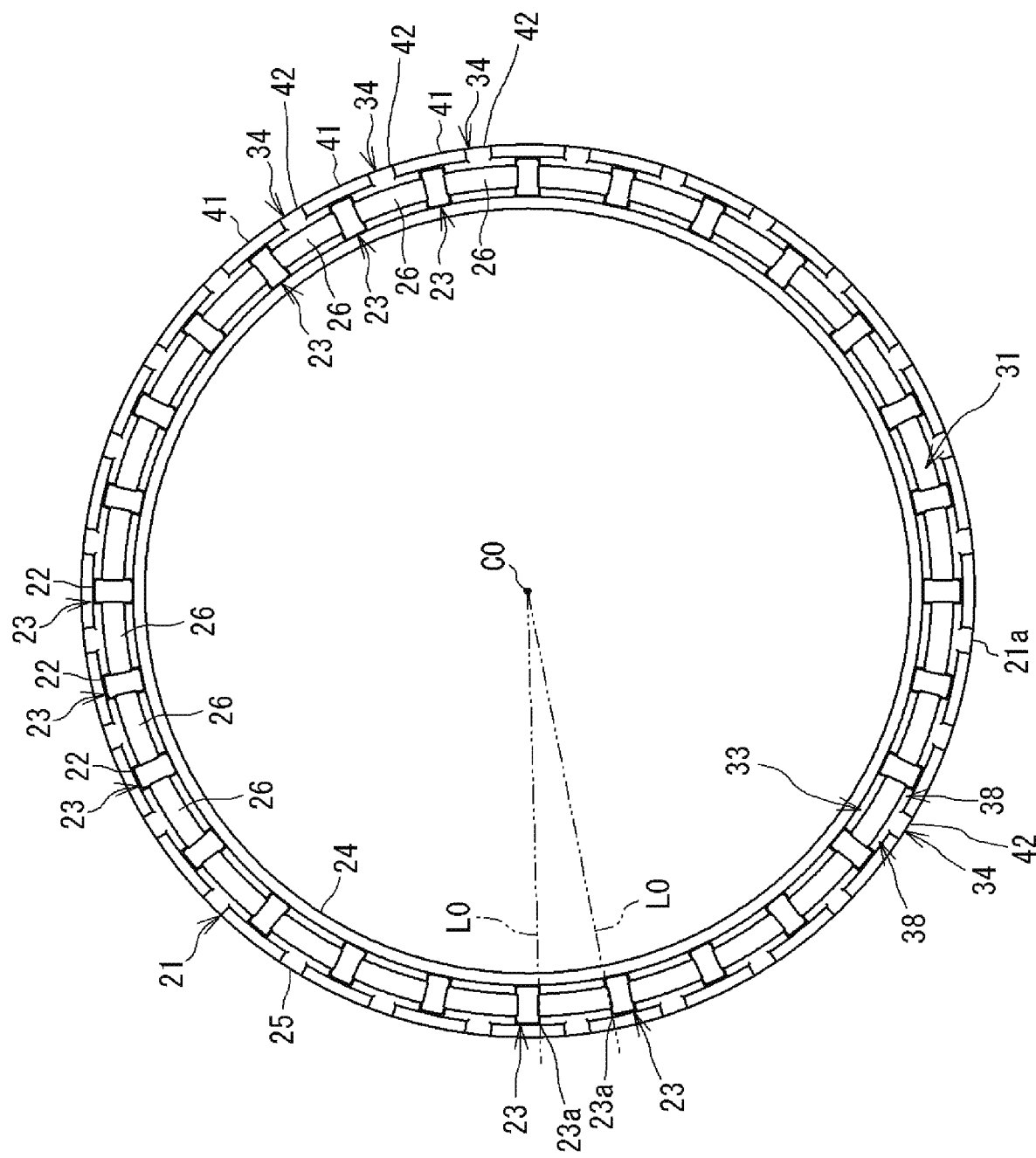
FIG. 2 is a diagram illustrating a cage and a plurality of rollers as viewed along a central axis of the cage.

The bearing 10 includes an annular cage 21 and a plurality of rollers 22. FIG. 2 is a diagram illustrating the cage 21 and the plurality of rollers 22 as viewed along a central axis C0 of the cage 21. Hereinafter, a direction along the central axis C0 of the cage 21 is an axial direction of the cage 21, and the term "axial" or "axially" refers to the axial direction thereof. Note that the axial direction includes directions parallel to the central axis C0. A direction orthogonal to the central axis C0 is a radial direction of the cage 21, and the term "radial" or "radially" refers to the radial direction thereof. A circumferential direction about the central axis C0 is a circumferential direction of the cage 21, and the term "circumferential" or "circumferentially" refers to the circumferential direction thereof. In the following description, it is assumed that the central axis C0 of the cage 21 coincides with a central axis of the bearing 10.

The bearing 10 according to the embodiment includes an annular first bearing ring 11 located on one side (upper side in FIG. 1) in the axial direction (hereinafter referred to as a first axial side) and an annular second bearing ring 12 located on the other side (lower side in FIG. 1) in the axial direction (hereinafter referred to as a second axial side). The first bearing ring 11 includes a ring-shaped first body portion 13 and a short-cylinder-shaped first rib portion 14. The first rib portion 14 extends toward the second axial side from a radially outer end portion 13a (left side in FIG. 1) of the first body portion 13. A flat, ring-shaped first raceway surface 15 is formed on the second axial side of the first body portion 13. The second bearing ring 12 includes a ring-shaped second body portion 16 and a short-cylinder-shaped second rib portion 17. The second rib portion 17 extends toward the first axial side from a radially inner end portion 16a (right side in FIG. 1) of the second body portion 16. A flat, ring-shaped second raceway surface 18 is formed on the first axial side of the second body portion 16. The cage 21 and the rollers 22 are disposed between the first bearing ring 11 and the second bearing ring 12. The rollers 22 roll on the first raceway surface 15 and the second raceway surface 18 as the bearing 10 rotates.

The first bearing ring 11 and the second bearing ring 12 may be omitted from the bearing 10. Although not illustrated, in this case, a first member included in a device that includes the bearing 10 serves as the first bearing ring 11, and a second member included in the device serves as the second bearing ring 12. The ring-shaped first raceway surface 15 is formed on the first member. The ring-shaped second raceway surface 18 is formed on the second member. Even when the first bearing ring 11 and the second bearing ring 12 are omitted, a member corresponding to at least one of the first rib portion 14 and the second rib portion 17 is provided to reduce detachment of the cage 21 that holds the rollers 22 in the radial direction.

As illustrated in FIG. 2, the cage 21 has a plurality of cage pockets 23. The cage pockets 23 are disposed radially about the central axis C0. The cage 21 includes an inner annular portion 24 located in a radially inner portion of the cage 21, an outer annular portion 25 located in a radially outer portion of the cage 21, and a plurality of cage bars 26 that connects the inner annular portion 24 and the outer annular portion 25. Each space between a circumferentially adjacent pair of the cage bars 26 and 26 in a region between the inner annular portion 24 and the outer annular portion 25 serves as each of the cage pockets 23.

The rollers 22 are cylindrical and referred to as cylindrical rollers. Each of the cage pockets 23 houses one of the rollers 22. Central axes of the rollers 22 are disposed on imaginary lines extending along the radial directions from the central axis C0 of the cage 21. As illustrated in FIG. 1, the plurality of rollers 22 is disposed between the first raceway surface 15 and the second raceway surface 18 that axially face each other. Although the rollers 22 do not actually overlap the cage bars 26, for clarity of description, the roller 22 is indicated by a long dashed double-short dashed line (hidden line) in FIG. 1 such that the roller 22 overlaps the cage bar 26.

An annular space 20 is defined between the first raceway surface 15 (of the first bearing ring 11) and the second raceway surface 18 (of the second bearing ring 12). The cage 21 and the rollers 22 are disposed in the annular space 20. As the bearing 10 rotates, a centrifugal force causes lubricating oil around (an inner circumference of) the bearing 10 to flow in the annular space 20 from a radially inner side to a radially outer side. In FIG. 1, the lubricating oil flows from right to left. An opening 27 is defined between a radially inner end portion 13b of the first bearing ring 11 and the second rib portion 17 of the second bearing ring 12. The lubricating oil flows into the annular space 20 through the opening 27. An opening 28 is defined between a radially outer end portion 16b of the second bearing ring 12 and the first rib portion 14 of the first bearing ring 11. The lubricating oil flows out of the annular space 20 through the opening 28. In FIG. 1, flow of the lubricating oil flowing into the annular space 20 through the opening 27 is indicated by an arrow F1, and flow of the lubricating oil flowing out of the annular space 20 through the opening 28 to the outside of the bearing 10 is indicated by an arrow F2.

The rollers 22, the first bearing ring 11, and the second bearing ring 12 are made of steel. Although the cage 21 may be made of metal (made of steel), in the embodiment, the cage 21 is made of plastic to reduce sliding friction resistance.

Figure 3:
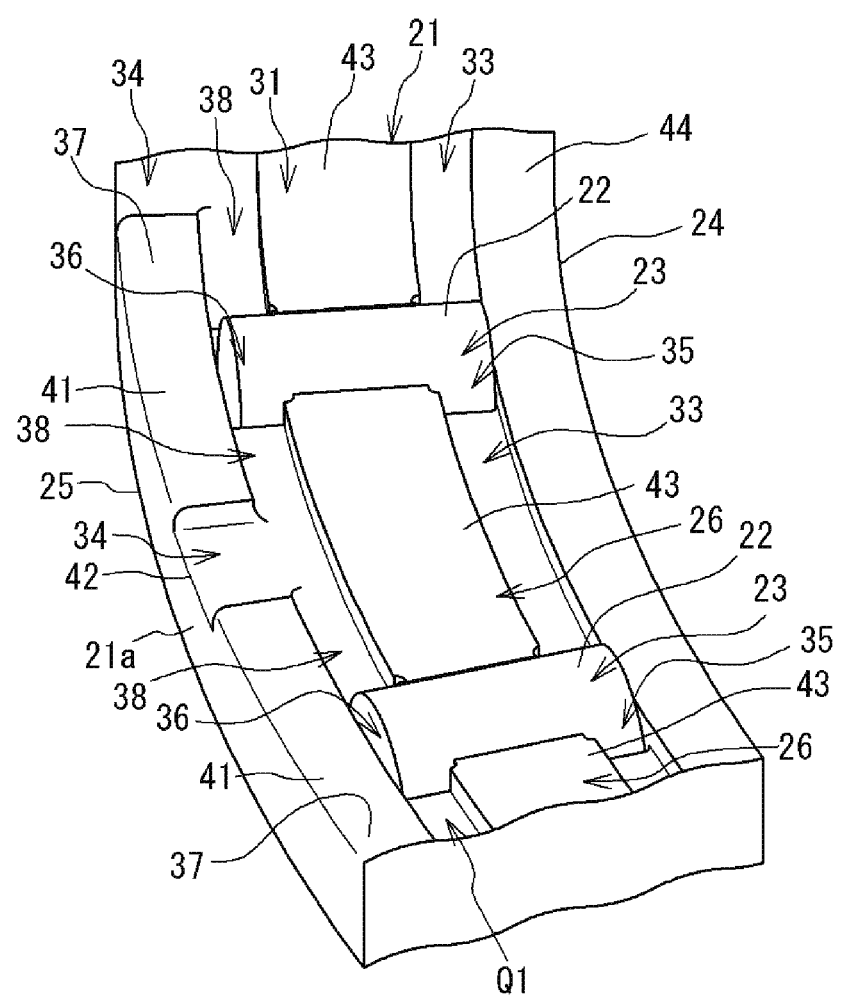
FIG. 3 is a perspective partial view of the cage, illustrating a side on which a first side surface is provided.

The cage 21 includes a first side surface 31 that is a side surface facing the first raceway surface 15 and a second side surface 32 that is a side surface facing the second raceway surface 18. In FIG. 1, each of a boundary between the cage bar 26 and the outer annular portion 25 and a boundary between the cage bar 26 and the inner annular portion 24 is indicated by a dashed line. FIG. 3 is a perspective partial view of the cage 21, illustrating a side on which the first side surface 31 is provided (hereinafter referred to as the first side surface 31 side). First inner grooves 33 (hereinafter sometimes simply referred to as the inner grooves 33) and a plurality of first drainage grooves 34 (hereinafter sometimes simply referred to as the drainage grooves 34) are provided in the first side surface 31. Connecting grooves 38 are provided in the first side surface 31. The inner grooves 33 and the connecting grooves 38 are provided individually to each of the plurality of cage bars 26. The plurality of drainage grooves 34 is disposed along the outer annular portion 25.

The inner grooves 33 are provided in a radially inner portion of the first side surface 31. The connecting grooves 38 are provided in a radially outer portion of the first side surface 31. Each of the inner grooves 33 connects a circumferentially adjacent pair of the cage pockets 23 and 23 and, more particularly, connects radially inner areas 35 (the areas 35 close to the inner annular portion 24) of the pair of cage pockets 23. Each of the inner grooves 33 is open at its opposite circumferential ends to the cage pockets 23. The inner grooves 33 function as guide grooves that guide lubricating oil to the cage pockets 23 and the rollers 22. This is described later.

As illustrated in FIG. 2, the drainage grooves 34 are provided in the outer annular portion 25. The outer annular portion 25 is an annular portion located radially outside the cage pockets 23 and the cage bars 26. The outer annular portion 25 includes first arcuate portions 41 and second arcuate portions 42 that are alternately arranged along the circumferential direction. The first arcuate portions 41 are portions located radially outside the cage pockets 23. The second arcuate portions 42 are portions located radially outside the cage bars 26. As illustrated in FIG. 2 and FIG. 3, the drainage grooves 34 are provided in the second arcuate portions 42. Each of the drainage grooves 34 is a groove provided radially and has an opening at an outer circumferential surface 21a of the cage 21. The drainage grooves 34 function as drainage grooves for draining lubricating oil in a circumferential area Q1 including radially outer areas 36 (see FIG. 3) of the cage pockets 23 and the connecting grooves 38 radially outward. This is described later.

Figure 4:
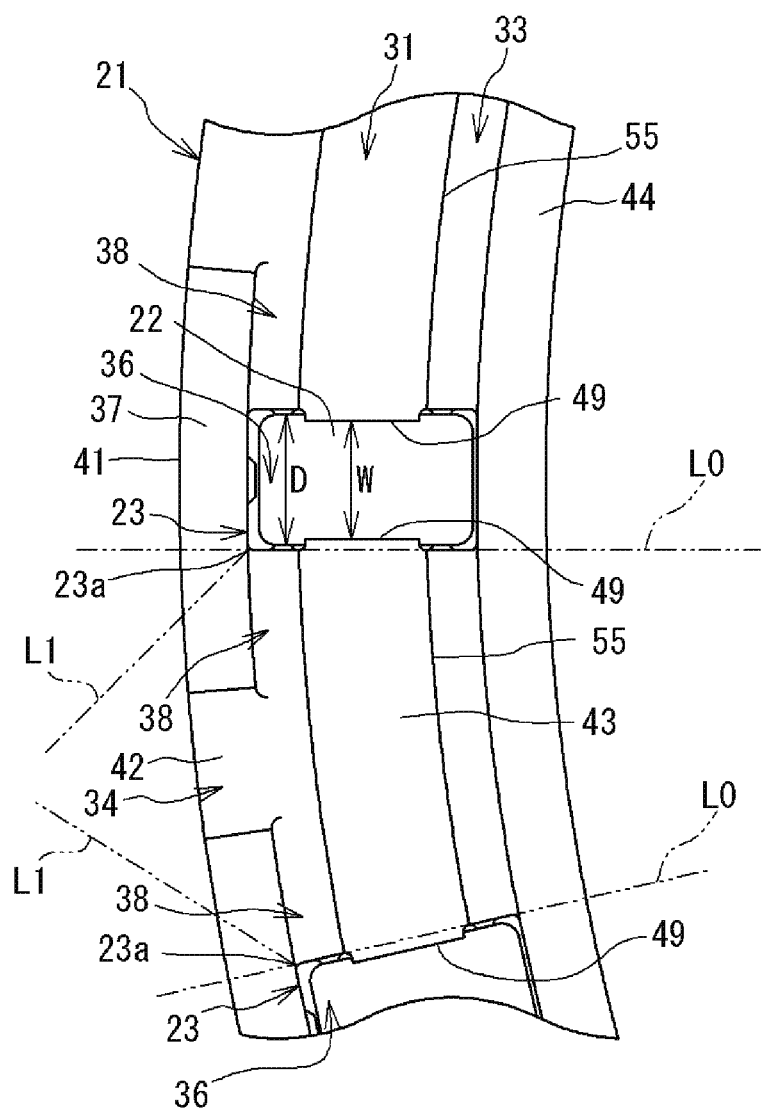
FIG. 4 is a partial view of the first side surface of the cage as viewed in an axial direction of the cage.

FIG. 4 is a partial view of the first side surface 31 of the cage 21 as viewed in the axial direction. Hence, FIG. 4 is an enlarged partial view of FIG. 2. In FIG. 2 and FIG. 4, radial imaginary lines extend through the central axis C0 and a radially outer corner portion 23a of one of the cage pockets 23, and are denoted as reference lines L0. In FIG. 4, each of imaginary lines is tilted 45 degrees toward one of the second arcuate portions 42 with respect to a corresponding one of the reference lines L0. The imaginary lines are denoted as borderlines L1. Each of the drainage grooves 34 is provided in one of the second arcuate portions 42 at a position between a circumferentially adjacent pair of the borderlines L1 and L1. In other words, the drainage grooves 34 are provided in areas circumferentially away from the cage pockets 23. This is because this configuration is advantageous in terms of strength of the cage 21. This is described later.

As illustrated in FIG. 3 and FIG. 4, the connecting grooves 38 connect the radially outer areas 36 of the cage pockets 23 and the drainage grooves 34. The connecting grooves 38 are open to the cage pockets 23. The connecting grooves 38 are provided along the circumferential direction.

As illustrated in FIG. 1 and FIG. 3, the first side surface 31 includes first guide surfaces 37, middle surfaces 43, and an inner side surface 44 arranged in this sequence toward a radially inner end of the first side surface 31. The inner grooves 33 are provided between the middle surfaces 43 and the inner side surface 44. The connecting grooves 38 are provided between the middle surfaces 43 and the first guide surfaces 37. The first guide surfaces 37 are surfaces on a radially outer portion of the first side surface 31. Areas of a side surface on the first axial side of the outer annular portion 25 other than the drainage grooves 34 serve as the first guide surfaces 37. The inner side surface 44 is a surface on a radially inner portion of the first side surface 31. The inner side surface 44 is an annular side surface on the first axial side of the inner annular portion 24. The middle surfaces 43 are surfaces on a radially middle portion of the first side surface 31. Each of the middle surfaces 43 is a part of an arcuate side surface on the first axial side of one of the cage bars 26.

As illustrated in FIG. 1, an axial clearance e1 is provided between the first guide surfaces 37 and the first raceway surface 15. Other axial clearances are also provided between the first raceway surface 15 and the surfaces of the first side surface 31 other than the first guide surfaces 37. More specifically, an axial clearance e2 is provided between the middle surfaces 43 and the first raceway surface 15. An axial clearance e3 is provided between the inner side surface 44 and the first raceway surface 15. The clearance e1 at the first guide surfaces 37 is smaller than the clearances (e2 and e3) at radially inner surfaces (the middle surfaces 43 and the inner side surface 44) of the first side surface 31 other than the first guide surfaces 37. The clearance e2 between the middle surfaces 43 and the first raceway surface 15 is smaller than the clearance e3 between the inner side surface 44 and the first raceway surface 15. Thus, the distance (clearance) between the first side surface 31 and the first raceway surface 15 is structured such that the clearance is the largest at the inner side surface 44, followed by the middle surfaces 43 and the first guide surfaces 37. Groove bottom surfaces 33a of the inner grooves 33, groove bottom surfaces 38a of the connecting grooves 38, and groove bottom surfaces 34a of the drainage grooves 34 are further away from the first raceway surface 15 than the inner side surface 44 is. The groove bottom surfaces 38a of the connecting grooves 38 are flush with the groove bottom surfaces 34a of the drainage grooves 34.

When the cage 21 is displaced toward the first raceway surface 15 along the central axis C0 of the cage 21, the first guide surfaces 37 contact the first raceway surface 15. By contrast, even when the cage 21 is displaced as described above, the middle surfaces 43 and the inner side surface 44 do not contact the first raceway surface 15 (remain non-contact).

Figure 5:
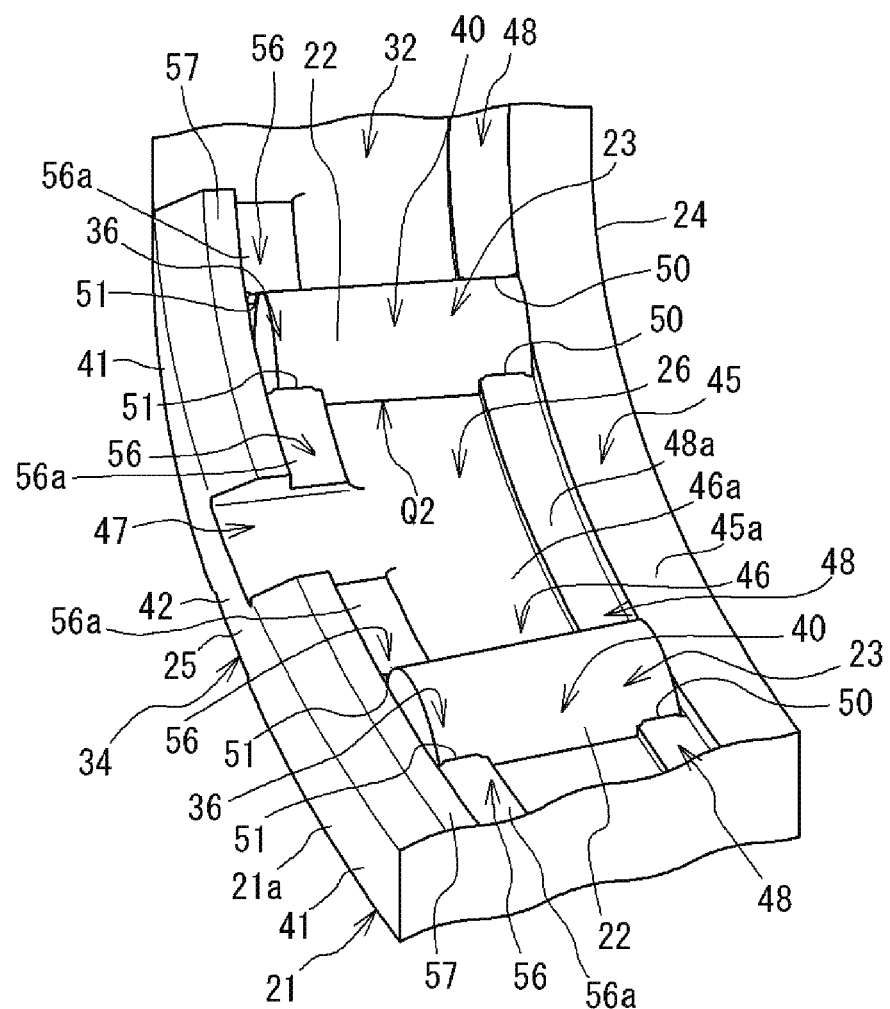
FIG. 5 is a perspective partial view of the cage, illustrating a side on which a second side surface is provided.

FIG. 5 is a perspective partial view of the cage 21, illustrating a side on which the second side surface 32 is provided (hereinafter referred to as the second side surface 32 side). A second inner groove 45 (hereinafter sometimes simply referred to as the inner groove 45), middle grooves 46, and second drainage grooves 47 (hereinafter sometimes simply referred to as the drainage grooves 47) are provided in the second side surface 32. The inner groove 45 is provided in the inner annular portion 24. The middle grooves 46 are provided in the respective cage bars 26. The drainage grooves 47 are provided in the outer annular portion 25. The second drainage grooves 47 are provided in the second arcuate portions 42 of the outer annular portion 25 in a manner similar to that in which the first drainage grooves 34 are provided. Each of the second drainage grooves 47 is a radially extending groove and has an opening at the outer circumferential surface 21a of the cage 21. The second drainage grooves 47 function as drainage grooves for draining lubricating oil on the second side surface 32 side radially outward. This is described later.

As illustrated in FIG. 1 and FIG. 5, the inner groove 45 is provided in a radially inner portion of the second side surface 32. The second drainage grooves 47 are provided in a radially outer portion of the second side surface 32. The middle grooves 46 are provided in an area between the inner groove 45 and the drainage grooves 47 of the second side surface 32. First raised portions 48 (hereinafter sometimes simply referred to as the raised portions 48) are provided between the inner groove 45 and the middle grooves 46. The raised portions 48 are raised to be closer to the second raceway surface 18 than a groove bottom surface 45a of the inner groove 45 and groove bottom surfaces 46a of the middle grooves 46 are. The raised portions 48 include raised surfaces 48a that are surfaces facing the second raceway surface 18.

The inner groove 45 is provided between the raised portions 48 and the second rib portion 17 (see FIG. 1) of the second bearing ring 12. As illustrated in FIG. 5, each of the middle grooves 46 connects a circumferentially adjacent pair of the cage pockets 23 and 23 and, more particularly, connects radially middle areas 40 of the pair of cage pockets 23. Each of the middle grooves 46 is open at its opposite circumferential ends to the cage pockets 23. The second drainage grooves 47 communicate with the middle grooves 46. The middle grooves 46 function as connecting grooves that connect the cage pockets 23 and the second drainage grooves 47.

The second side surface 32 includes second guide surfaces 57 on its radially outer portion. Areas of a side surface on the second axial side of the outer annular portion 25 other than the second drainage grooves 47 serve as the second guide surfaces 57. As illustrated in FIG. 1, an axial clearance e11 is provided between the second guide surfaces 57 and the second raceway surface 18. Other axial clearances are also provided between the second raceway surface 18 and the surfaces of the second side surface 32 other than the second guide surfaces 57. More specifically, an axial clearance e12 is provided between the groove bottom surfaces 46a and the second raceway surface 18. An axial clearance e13 is provided between the raised surfaces 48a and the second raceway surface 18. The clearance e11 at the second guide surfaces 57 is smaller than the clearances (e12 and e13) at radially inner surfaces (e.g., the groove bottom surfaces 46a and the raised surfaces 48a) of the second side surface 32 other than the second guide surfaces 57.

When the cage 21 is displaced toward the second raceway surface 18 along the central axis C0 of the cage 21, the second guide surfaces 57 contact the second raceway surface 18. By contrast, even when the cage 21 is displaced as described above, the other surfaces (e.g., the groove bottom surfaces 46a and the raised surfaces 48a) of the second side surface 32 do not contact the second raceway surface 18 (remain non-contact).

The cage 21 is structured to reduce detachment of the rollers 22 housed in the cage pockets 23. For this purpose, as illustrated in FIG. 4, tabs 49 that reduce detachment of the rollers 22 are provided on the cage 21 on opposite circumferential ends of middle portions 55 on which the middle surfaces 43 are formed. The tabs 49 project toward the roller 22 held in the cage pocket 23. A distance W between the tabs 49 and 49 circumferentially sandwiching the cage pocket 23 is smaller than a diameter D of the roller 22 (W<D). Hence, detachment of the roller 22 from the cage pocket 23 is reduced. As illustrated in FIG. 5, tabs 50 that reduce detachment of the rollers 22 are provided on opposite circumferential ends of the raised portions 48 of the cage 21. Furthermore, second raised portions 56 are provided adjacent to (circumferentially adjacent to) the radially outer areas 36 of the cage pockets 23. A tab 51 that reduces detachment of the roller 22 is provided on each of the second raised portions 56. The tabs 50 and 51 project toward the roller 22 held in the cage pocket 23. A distance between the tabs 50 and 50 circumferentially sandwiching the cage pocket 23 is smaller than the diameter D of the roller 22. A distance between the tabs 51 and 51 circumferentially sandwiching the cage pocket 23 is smaller than the diameter D of the roller 22. Hence, detachment of the roller 22 from the cage pocket 23 is reduced. The tabs 49 (or the tabs 50 and 51) are deformed when the roller 22 is housed in the cage pocket 23.

The tabs 49, 50, and 51 function as anti-detachment portions for the rollers 22 in a state in which a unit configured of the cage 21 and the rollers 22 is separated from the first bearing ring 11 and the second bearing ring 12. The tabs 49, 50, and 51 function as the anti-detachment portions for the rollers 22 when the unit configured of the cage 21 and the rollers 22 is assembled to a position between (the first raceway surface 15 of) the first bearing ring 11 and (the second raceway surface 18 of) the second bearing ring 12, for example.

The tabs 49, 50, and 51 do not function in a state illustrated in FIG. 1 or, in other words, in a finished state in which the unit configured of the cage 21 and the rollers 22 is assembled to the position between the first raceway surface 15 and the second raceway surface 18. More specifically, in the finished state, any of the tabs 49, 50, and 51 does not contact the rollers 22 even when the cage 21 is axially displaced. In the finished state, when the cage 21 is axially displaced, either the first guide surfaces 37 or the second guide surfaces 57 contact a corresponding one of the first raceway surface 15 and the second raceway surface 18 before the tabs 49 or the tabs 50 and 51 contact the rollers 22. Thus, the first raceway surface 15 and the second raceway surface 18 axially position the cage 21.

Any one of the first rib portion 14 and the second rib portion 17 radially positions the cage 21. In the embodiment, the second rib portion 17 radially positions the cage 21. To achieve this (see FIG. 1), a clearance e4 provided between an inner circumferential surface 24a of the inner annular portion 24 and the second rib portion 17 is smaller than a clearance e5 between an outer circumferential surface 25a of the outer annular portion 25 and the first rib portion 14 (e4<e5). When the cage 21 is radially displaced, the inner circumferential surface 24a of the inner annular portion 24 contacts the second rib portion 17, thus limiting displacement of the cage 21. In the cage 21, a peripheral speed at a position closer to the inner circumferential surface 24a is smaller than a peripheral speed at a position closer to the outer circumferential surface 25a. Hence, it is more preferable that the cage 21 be guided by the second rib portion 17 than by the first rib portion 14 in view of seizure resistance, for example.

As described above, the bearing 10 according to the embodiment includes the annular cage 21 having the plurality of cage pockets 23 that is radially disposed, and the plurality of rollers 22 housed in the cage pockets 23. The plurality of rollers 22 is disposed between the first raceway surface 15 and the second raceway surface 18 that axially face each other. As illustrated in FIG. 3, the cage 21 has the first inner grooves 33 and the first drainage grooves 34. Each of the first inner grooves 33 connects a circumferentially adjacent pair of the cage pockets 23 and 23 by connecting the radially inner areas 35 of the pair of cage pockets 23. Each of the first drainage grooves 34 has an opening at the outer circumferential surface 21a of the cage 21 to drain lubricating oil in the circumferential area Q1 including the radially outer areas 36 of the cage pockets 23 radially outward.

As the bearing 10 rotates, lubricating oil flows in the annular space 20 (see FIG. 1) from the radially inner side to the radially outer side. More specifically, the lubricating oil flows from a radially inner portion serving as a lubricating-oil entrance (inlet) portion of the annular space 20 to a radially outer portion serving as a lubricating-oil exit (outlet) portion of the annular space 20. The inner grooves 33 can guide the entered lubricating oil to the cage pockets 23 and the rollers 22. The guided lubricating oil enables reducing sliding friction resistance that develops between the rollers 22 and the first raceway surface 15 and between the rollers 22 and the second raceway surface 18, for example. The lubricating oil that flows radially outward along the cage pockets 23 and the rollers 22 does not accumulate and can be drained radially outward out of the cage 21 through the first drainage grooves 34.

As illustrated in FIG. 5, according to the embodiment, the cage 21 has the second inner groove 45 and the second drainage grooves 47. The second inner groove 45 connects a circumferentially adjacent pair of the cage pockets 23 and 23 by connecting the radially inner areas 35 of the pair of cage pockets 23. Each of the second drainage grooves 47 has an opening at the outer circumferential surface 21a of the cage 21 to drain lubricating oil in a circumferential area Q2 including the radially outer areas 36 of the cage pockets 23 radially outward.

Thus, the drainage grooves 34 are provided in the first side surface 31 of the cage 21, and the drainage grooves 47 are provided in the second side surface 32 of the cage 21. Hence, lubricating oil that flows between the cage 21 and the first raceway surface 15 can be drained through the first drainage grooves 34. Lubricating oil that flows between the cage 21 and the second raceway surface 18 can be drained through the second drainage grooves 47. Accordingly, accumulation of lubricating oil in the annular space 20 is suppressed, enabling reduction in stirring resistance generated by excessive lubricating oil. As described above, the bearing 10 according to the embodiment can reduce both sliding friction resistance and stirring resistance of lubricating oil that are factors of rolling resistance. The bearing 10 can thus achieve a lower torque and increase rolling efficiency or, in other words, reduce rolling loss, of a device that uses the bearing 10. Reducing sliding friction resistance and stirring resistance of lubricating oil in the bearing 10 enables suppressing temperature rise.

As described above (see FIG. 2 and FIG. 4), the drainage grooves 34 are provided in the areas circumferentially away from the cage pockets 23. More specifically, the outer annular portion 25 included in the cage 21 includes the first arcuate portions 41 and the second arcuate portions 42 that are alternately arranged along the circumferential direction. The first drainage grooves 34 and the second drainage grooves 47 are provided in the second arcuate portions 42.

As the cage 21 rotates, each of the rollers 22 is urged to move radially outward by a centrifugal force. Each of the rollers 22 thus pushes the outer annular portion 25 radially outward. A circumferential tensile stress is applied to the outer annular portion 25. The first arcuate portions 41 are located close to the cage pockets 23 and therefore less strong than the second arcuate portions 42. More specifically, not only the circumferential tensile stress described above but also a bending stress develop in the second arcuate portions 42, which locally increases a stress on the second arcuate portions 42.

The first drainage groove 34 (the second drainage groove 47) in the outer annular portion 25 reduces the thickness (reduces an axial dimension) of the outer annular portion 25. Hence, it is preferable to provide the first drainage groove 34 and the second drainage groove 47 in the second arcuate portion 42 that includes the area distant from the cage pockets 23 rather than in the first arcuate portion 41 in which the stress is locally high due to the cage pocket 23. This configuration is advantageous in terms of strength of the cage 21.

The first drainage grooves 34 are located away from the cage pockets 23 as described above. The drainage grooves 34 are connected to the radially outer areas 36 of the cage pockets 23 via the connecting grooves 38. This configuration enables lubricating oil that is guided through the first inner grooves 33 to the cage pockets 23 and the rollers 22 and that flows radially outward along the cage pockets 23 and the rollers 22 to flow into the drainage grooves 34 through the connecting grooves 38. Consequently, the function of draining lubricating oil radially outward through the drainage grooves 34 out of the cage 21 is enhanced.

The cage 21 (see FIG. 1) according to the embodiment includes the first guide surfaces 37 and the second guide surfaces 57. When the cage 21 is displaced toward the first raceway surface 15, the first guide surfaces 37 contact the first raceway surface 15. When the cage 21 is displaced toward the second raceway surface 18, the second guide surfaces 57 contact the second raceway surface 18. Thus, the bearing 10 according to the embodiment is a bearing of a type in which the first raceway surface 15 and the second raceway surface 18 guide the cage 21 that is rotating. Both the clearance e1 between the first guide surfaces 37 and the first raceway surface 15 and the clearance e11 between the second guide surfaces 57 and the second raceway surface 18 are small. Hence, each of the clearance e1 and the clearance e11 may undesirably function as a restrictor and restrict flow of lubricating oil if the drainage grooves 34 and 47 are not provided. However, in the bearing 10 according to the embodiment, the drainage grooves 34 and 47 are provided in the outer annular portion 25 on which the first guide surfaces 37 and the second guide surfaces 57 are formed. Therefore, the bearing 10 of the type described above can achieve the function of draining lubricating oil.

On the first side surface 31 side, as described above, the clearance e2 between the middle surfaces 43 and the first raceway surface 15 is small (smaller than the clearance e3) but is larger than the clearance e1. The tabs 49 that reduce detachment of the rollers 22 are provided on the middle portions 55 on which the middle surfaces 43 are formed (see FIG. 4). It is necessary to deform the tabs 49 when the rollers 22 are housed in the cage pockets 23 as described above. At this time, not only elastic deformation but also plastic deformation may locally occur at and around one or more of the tabs 49. Furthermore, the plastic deformation may cause the portion to protrude toward the first raceway surface 15. In view of the above, according to the embodiment, the clearance e2 between the middle surfaces 43 and the first raceway surface 15 is larger than the clearance e1 as described above. Even when the plastic deformation occurs so as to cause the portion to protrude toward the first raceway surface 15, the configuration in which the first guide surfaces 37, rather than the middle portions 55 (the middle surfaces 43, the tabs 49), are brought into contact with the first raceway surface 15 is maintained.

On the side on which the second raceway surface 18 is provided (see FIG. 1), the raised surfaces 48a of the first raised portions 48 and raised surfaces 56a of the second raised portions 56 are further away from the second raceway surface 18 than the second guide surfaces 57 are. The tabs 50 and the tabs 51 that reduce detachment of the rollers 22 are provided on the first raised portions 48 and the second raised portions 56, respectively (see FIG. 5). Even when plastic deformation occurs so as to cause protrusion toward the second raceway surface 18 at and around one or more of the tabs 50 and 51, the configuration in which the second guide surfaces 57, rather than the raised portions 48 and 56, are brought into contact with the second raceway surface 18 is maintained.

The disclosed embodiments are in every aspect illustrative and not restrictive. It should be understood that the scope of the invention is not limited to the embodiments described above and encompasses all modifications within the scope of the appended claims and equivalents thereof.

A needle roller thrust bearing of the invention can reduce both sliding friction resistance and stirring resistance of lubricating oil that are factors of rolling resistance.

What is claimed is:

1. A needle roller thrust bearing comprising:
   an annular cage having a plurality of cage pockets radially around the annular cage; and
   a plurality of rollers respectively housed in the plurality of cage pockets, the plurality of rollers being disposed between a first raceway surface and a second raceway surface of the thrust bearing that axially face each other, the cage and the plurality of rollers being provided in an annular space defined between the first raceway surface and the second raceway surface such that lubricating oil flows in the annular space from a radially inner side to a radially outer side, wherein:
   the cage includes:
      a plurality of inner grooves, each of the plurality of inner grooves connecting a circumferentially adjacent pair of the plurality of cage pockets by connecting radially inner areas of the pair of cage pockets,
      a plurality of drainage grooves, each of the plurality of drainage grooves extending in a radial direction of the cage to an outer circumferential surface of the cage and opening at the outer circumferential surface of the cage to drain lubricating oil radially outward in a circumferential area including radially outer areas of the plurality of cage pockets, and
      a plurality of middle grooves respectively located between and separating each of the plurality of inner grooves and each of the plurality of drainage grooves.

2. The needle roller thrust bearing according to claim 1, wherein the plurality of drainage grooves are provided both in a first side surface facing the first raceway surface and in a second side surface facing the second raceway surface of the thrust bearing.

3. The needle roller thrust bearing according to claim 1, wherein:
- the cage includes an inner annular portion located in a radially inner portion of the cage, an outer annular portion located in a radially outer portion of the cage, and a plurality of cage bars that each connects the inner annular portion and the outer annular portion,
- each of the cage pockets is formed by a space between a circumferentially adjacent pair of the cage bars in a region between the inner annular portion and the outer annular portion,
- the outer annular portion includes first arcuate portions located radially outside the cage pockets and second arcuate portions located radially outside the cage bars, the first arcuate portions and the second arcuate portions being alternately arranged along a circumferential direction, and
- the plurality of drainage grooves are provided in the second arcuate portions.

4. The needle roller thrust bearing according to claim 3, wherein the cage further includes connecting grooves that connect the cage pockets and the plurality of drainage grooves.

5. The needle roller thrust bearing according to claim 1, wherein the cage includes:
- a first guide surface that contacts the first raceway surface when the cage is displaced toward the first raceway surface, and
- a second guide surface that contacts the second raceway surface when the cage is displaced toward the second raceway surface.

6. The needle roller thrust bearing according to claim 1, wherein each of the plurality of middle grooves connect the pair of cage pockets and the respective drainage groove of the plurality of drainage grooves.

* * * * *